United States Patent [19]

Miller

[11] Patent Number: 4,494,935

[45] Date of Patent: Jan. 22, 1985

[54] MULTIPURPOSE GLOBE

[76] Inventor: Anna L. Miller, 112 Whispering Pines Dr., Waveland, Miss. 39576

[21] Appl. No.: 566,715

[22] Filed: Dec. 29, 1983

[51] Int. Cl.³ .............................................. G09B 27/08
[52] U.S. Cl. ..................................... 434/132; 434/147
[58] Field of Search ................ 434/147, 132, 292, 131

[56] References Cited

U.S. PATENT DOCUMENTS

| | | | |
|---|---|---|---|
| 854,513 | 5/1907 | Martin | 434/292 |
| 888,854 | 5/1908 | Sheldon | 434/132 |
| 1,523,188 | 1/1925 | Flood | 434/147 |
| 1,629,582 | 5/1927 | McClintock | 434/147 |
| 2,279,162 | 4/1942 | Dupler | 434/146 X |
| 2,373,258 | 4/1945 | Olsen | 434/152 |
| 2,957,251 | 10/1960 | Nystad et al. | 434/147 |
| 3,016,629 | 1/1962 | Case | 434/147 |
| 3,037,300 | 6/1962 | Grosser | 434/147 |
| 3,055,124 | 9/1962 | Gilmer, Jr. et al. | 434/132 |
| 3,374,560 | 3/1968 | Forsyth | 434/147 X |

FOREIGN PATENT DOCUMENTS 1166518  3/1964  Fed. Rep. of Germany ...... 434/152

Primary Examiner—William H. Grieb
Attorney, Agent, or Firm—Larson and Taylor

[57] ABSTRACT

A globe apparatus is provided which includes a basic globe or sphere to which are secured a series of detachable members or pieces. In one preferred embodiment, land masses (continents) are represented by flat pieces which snap into the globe surface and which support, in detachable snap-on relationship, additional pieces representing countries. The countries are shaped in relief to depict topological features (mountains, valleys, etc.) and similarly shaped pieces representing land masses are, in turn, detachable fitted thereover so that removal of the latter reveals the countries. Accessories such as auxilliary globes representing the sun and moon are also provided.

7 Claims, 11 Drawing Figures

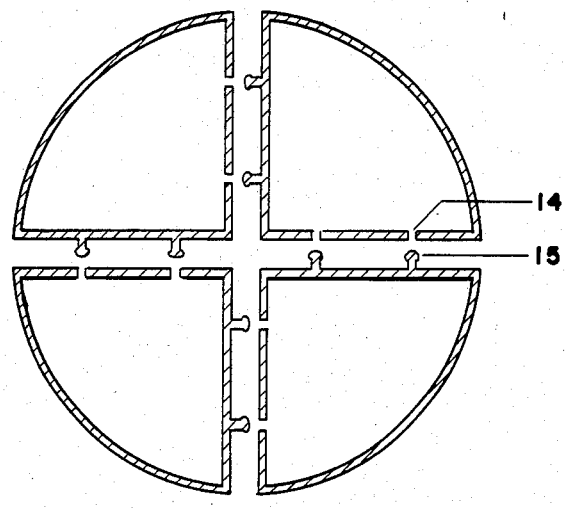
FIG. 5
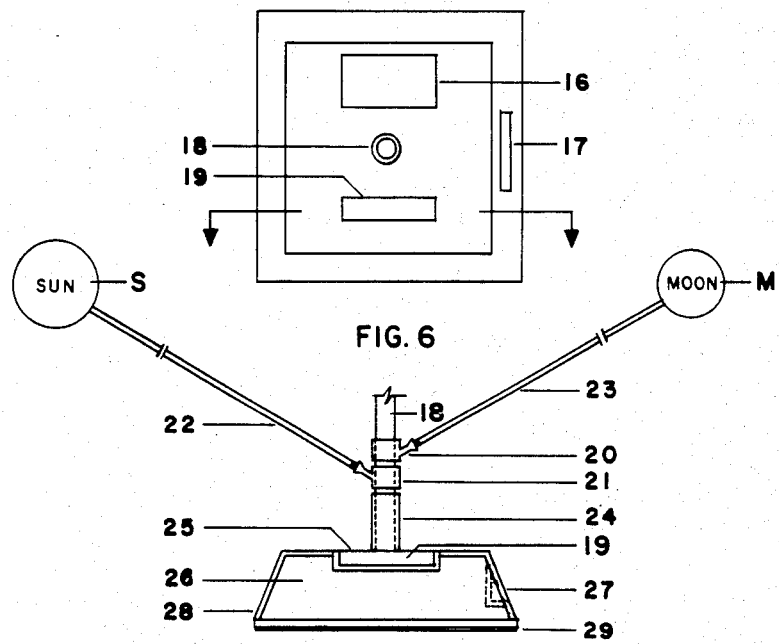
FIG. 6
FIG. 7

MULTIPURPOSE GLOBE

FIELD OF THE INVENTION

The present invention relates to a globe apparatus or device for instructional purposes.

BACKGROUND OF THE INVENTION

Teachers of the elementary to the college level have, though the years, expressed a deep concern as to the students' lack of knowledge and skill in regard to the understanding of world geography. Educators and administrators must meet the challenge of today's world by providing students with the necessary skills to realize achievement in geography, as a subject, so they may more fully understand the physical and social aspects of the complex global world on which we live. It is a belief of many educators that if pupils from the elementary grades through high school, including those in special education, are given a clear idea of the world as it is from the standpoint of geography, then and only then will these pupils be able to understand the world in all of its aspects.

A world globe is, of course, a familiar and time-tested teaching device and a number of globes of various types have been developed to use as instructional aids. Examples of such globes includes those disclosed in U.S. Pat. Nos. 1,523,188 (Flood); 2,279,162 (Dupler); 2,957,251 (Nystad et al); 3,016,629 (Case); 3,037,300 (Grosser); and 3,374,560 (Forsyth). The Flood patent discloses a globe wherein a series of maps, showing different features such as topographical features, political divisions and the like, are pasted one on top of the other on the globe. The Dupler patent discloses an illuminated globe. The Nystad et al patent discloses a jigsaw globe puzzle wherein map pieces are adhered to a globular shell using different forms of fastening elements. The Case patent discloses a globe including overlays in the form of transparent plastic segments which can be attached to the globe to show changes in political boundaries, geology and the like. The Grosser patent discloses a globe wherein replaceable "display pieces" in the form of hemispheric shells are mounted on a support and connected together by interlocking ribs. The Forsyth patent discloses a teaching aid including a frame or skeleton globe on which resilient pieces representing land masses are mounted.

SUMMARY OF THE INVENTION

Although the globes discussed above have various strengths and advantages, none of them possesses the strengths and advantages of the present invention particularly with regard to providing a hands-on tactile learning experience.

The multi-purpose globe of the invention serves as a teaching tool and/or a sophisticated educational toy to provide the learner with varied geographical experiences based on a carefully planned step-by-step teaching plan. A mastery of the globe can also be used as a comprehension aid for facts and ideas relative to other subjects such as science, history, mathematics, and the like. The globe of the invention will provide teachers, both new and experienced, with a tool to more successfully present and teach such concepts as the following: 1. The earth is a planet in our solar system shaped as a sphere; 2. Earth is composed of land and water; 3. Most of the earth is water; 4. Land areas are different in size and shape; 5. Land masses are called continents; 6. Continents are made up of countries; 7. Other land areas such as islands, peninsulas, isthmus, etc.; 8. Physical features and those land areas created by man are named; 9. Water bodies are different in size, shape, function; 10. Main and intermediate directions; 11. Meridians and parallels; 12. Longitude and latitude; 13. Climate belts; 14. Symbols and legends; 15. Time zones; 16. Day and night (rotation); 17. Earth in relation to moon; 18. Earth in relation to sun; 19. International date line; 20. Poles; 21. Artic Circle, Tropic of Cancer, Tropic of Capricorn, and Antartic Circle parallels; 22. Elevation scheme; 23. Hour circles; 24. Mathematical locations; 25. Location skills; 26. Relative locations; 27. Scale; and 28. Prime Meridian of Greenwich. The purpose of the invention is to provide a globe that is so unique in its function and use that it will create student interest, foster achievement, and provide the teacher with a means of teaching complicated, or even advanced concepts, in a most novel, successful, and enjoyable manner. The globe of the invention is very easy to assemble, is lightweight, durable, easy to store, is colorful and appealing to the eye, is made of parts which can be readily replaced, and is capable of being manufactured inexpensively.

In accordance with preferred embodiments of the invention, a globe apparatus is provided which comprises: a sphere having major land masses and oceans depicted on the outer surface thereof; a first set of detachable elements representing geopolitical entities (i.e. countries, states, etc.) detachably mounted on said outer surface of the sphere on portions thereof representing land masses, the outer edges of elements being in the shape of the geopolitical entity represented thereby; and a second set of detachable elements detachably mounted on the outer surface of the sphere on portions thereof representing land masses, the elements of the second set representing further divisions of the land masses, i.e., divisions (e.g., continents) other than the geopolitical entities represented by the first set. The upper surfaces of the elements of at least one of the sets are shaped in relief to represent topological features of the portion of the land mass represented thereby, i.e., such features as mountains and valleys are indicated in relief on the elements. Further, the one set of detachable elements is mounted on the sphere on top of the other set so as to cover the other set, whereby removal of the one set reveals the other set.

In one embodiment, the first set constitutes the aforesaid "one" set, i.e., the elements of the set representing geopolitical entities are also shaped to indicate surface features such as mountains, while the second set constitutes the aforesaid "other" set and comprises substantially flat elements representing continents. In this embodiment, the elements or pieces representing the continents are attached to the surface of the globe and the elements representing the countries and the like are attached thereto.

In another embodiment, the "second" set of elements represents continents and constitutes the "one" set, and the upper surfaces of the first set of elements are also shaped in relief so as to represent topological features of the geopolitical entities represented thereby. Preferably, a third set of elements is also detachably mounted on the globe, the elements of the third set being substantially flat and the first and second sets of elements being detachably mounted thereon.

The globe apparatus of the invention possesses a number of further important features including various accessories that are used with the globe itself. These and other features, and the advantages thereof, will be described in, or apparent from, the detailed description of the invention which follows.

BRIEF DESCRIPTION OF THE DRAWINGS

FIG. 5 is an exploded cross section of the globe with the globe divided into quarters.

FIG. 6 is a plan view of the base of a desk top model of the globe.

FIG. 7 is a cross sectional view of the desk top base of FIG. 6 including assessories for the globe.

FIG. 10 is a plan view of a hand power pack which can be used in lieu of a wall plug-in.

DESCRIPTION OF THE PREFERRED EMBODIMENTS

Figure 1:
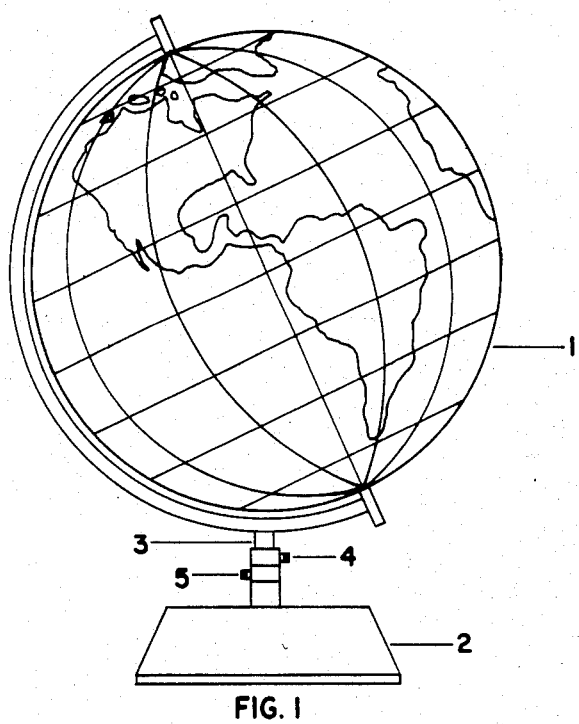
FIG. 1 is an elevation showing a desk model with base.
Figure 2:
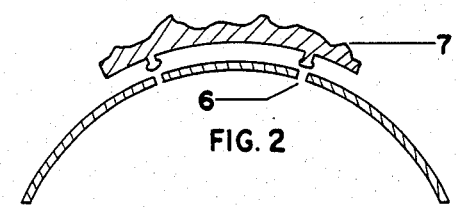
FIG. 2 is a cross sectional view illustrating attachment of a continent to the surface of the globe.

Referring to FIG. 1, a globe is shown which is generally denoted 1 and which is adapted to be mounted on a desk top base 2. As explained in more detail herein below, there are holes (denoted 6 in FIG. 2 and 8 in FIG. 3) provided in the surface of the globe 1 as needed, and some islands and small countries are also painted or otherwise provided on the surface of the globe. In addition to the islands and countries painted on the surface, conventional features such as ocean names, latitude lines, longitude lines, and other conventional features of a globe are similarly provided on the globe. A stem 3 attaches the globe 1 to the desk top base 2 and contains special rings 4 and 5. These rings have receiving areas, as shown, whereby special devices can be attached for rotating purposes. This feature will be discussed further in connection with FIG. 7. Referring to FIG. 2, a section of the surface of the globe is depicted wherein openings 6 are provided in the surface to allow special snap-on continents 7 to be pressed into place. The globe area into which the continents fit and the relating continent piece 7 are matched by the use of numbers or the like, thereby allowing easy assembly of all pieces. This basic approach is used in the embodiment of FIG. 3 now to be described.

Figure 3:
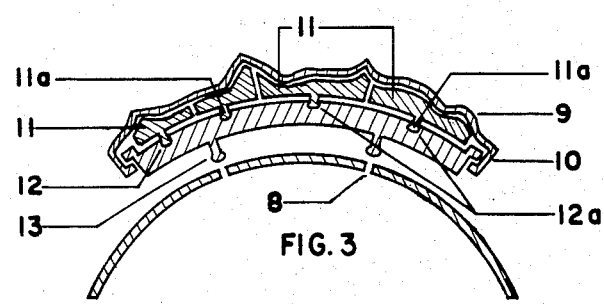
FIG. 3 is a cross sectional view illustrating the manner of attachment of the various pieces or elements to each other and to the surface of the globe.
Figure 4:
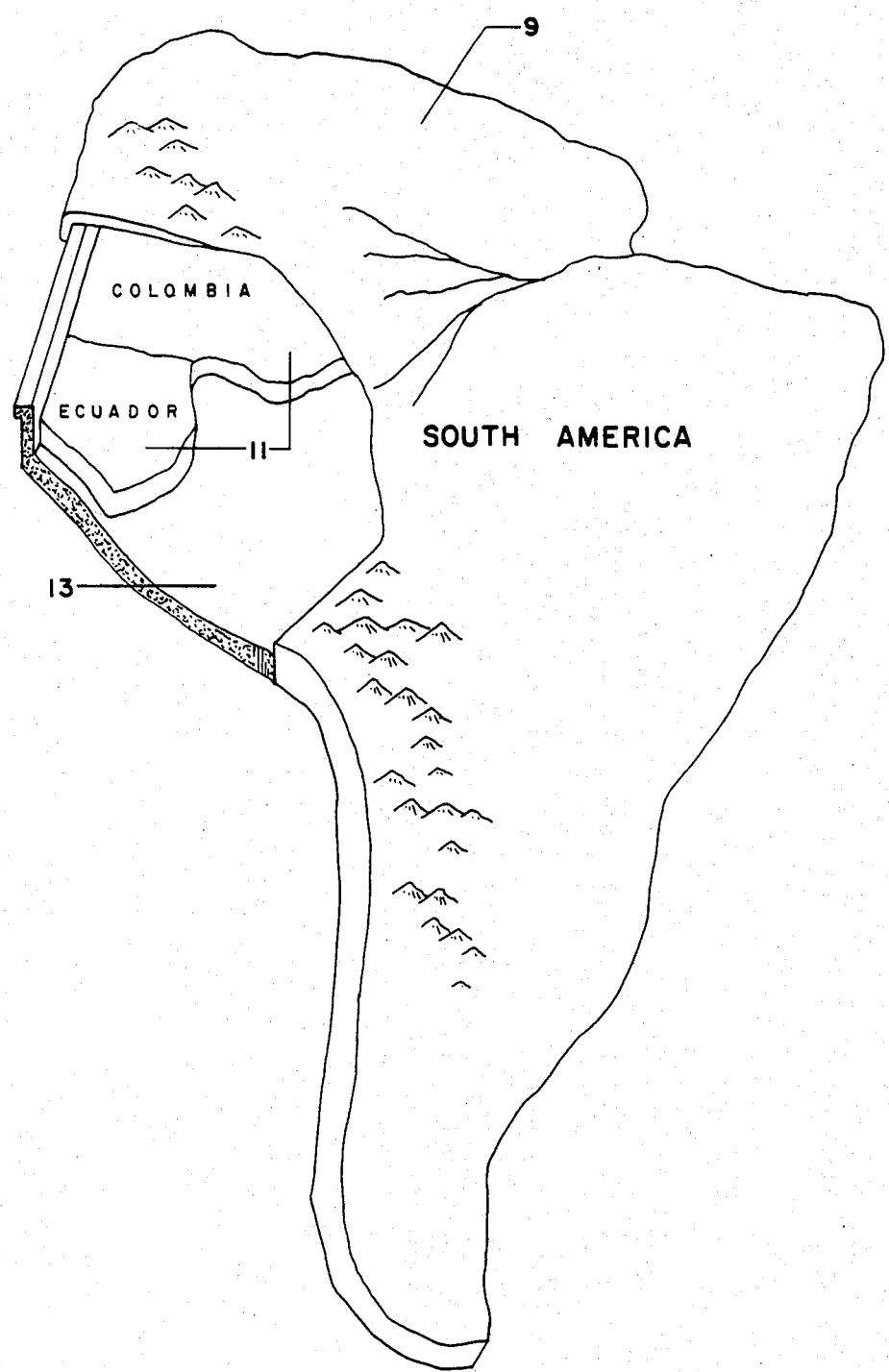
FIG. 4 is a partially broken away perspective view of the embodiment of FIG. 3 for a typical continent and corresponding countries.

Referring to FIG. 3, openings in the surface of the globe are denoted 8 and a continent member 9 is provided which is of a hollow shell-like form and which, as illustrated, is shaped in relief in accordance with the corresponding topological features (mountains, plains, valleys and the like) that characterize the continent represented thereby. Continent members or pieces 9 include snap-on edge portions 10 which enable the shaped continent members 9 to be snap fit onto further flat continent members 12. Further, a series of country members 11 are snap fit by means of projections 11a, into corresponding holes 12a in the flat continent member 12, the latter being, in turn, attached to the globe by means of projections 13, constructed of plastic, rubber or the like. The projections 13 are slightly elongated as compared with those of FIG. 2 so when the elongated portion penetrates the surface of the globe the continent member 13 fits tightly to the curvature of the globe. FIG. 4 is a perspective view of the embodiment of FIG. 3 and shows how the various members or pieces fit together. It will be understood that the pieces shown in FIG. 4 would all actually be curved to conform to the curvature of the globe. It will be appreciated that the arrangement shown in FIGS. 3 and 4 allows the instructor to show how the shaped land masses (continents) with their reliefs, as represented by members 9, fit on the surface of the globe. Then, by removing the overlying continent relief members 9, the country relief members 11, which match the continent relief members 9 in topography, are individually attached as shown. It is important that the student be able to pick up the shaped pieces in his or her hands so as to provide a strong tactile sense impression of the topological shapes involved. It is noted that, in addition, members showing climate belts and other special features can be snapped into the holes in the globe (or in the underlying pieces or members) for teaching purposes.

In FIG. 5, a section is shown depicting how the globe can be divided into northern and southern hemispheres or into other portions as desired. All of the snap-in apertures or holes, indicated at 14, and all of the snap-in tips, indicated at 15, are offset a sufficient distance from the globe surface so these connection points will not interfere with the aforementioned surface connection points described in connection with FIG. 2, FIG. 3 and FIG. 4.

Figure 9:
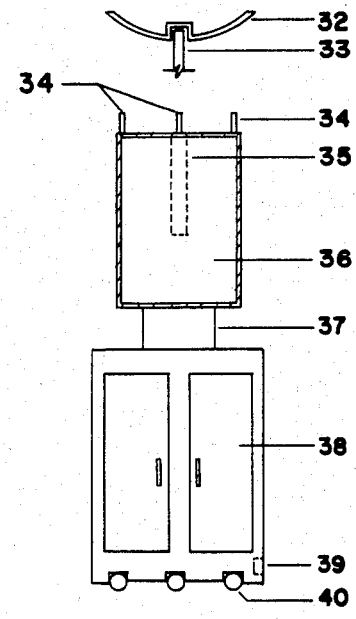
FIG. 9 is a side elevational view, partially in section, of the self-contained unit of FIG. 8.
Figure 10:
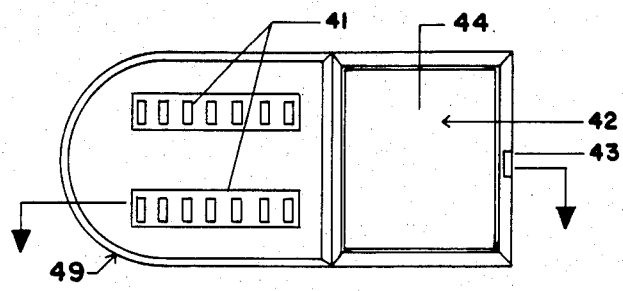
Figure 11:
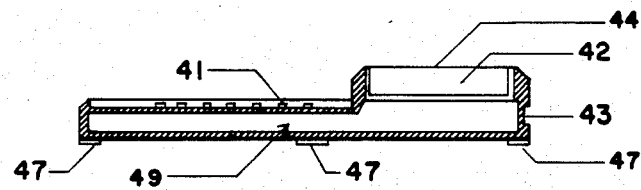
FIG. 11 is a cross sectional view of the hand power pack of FIG. 10.

Referring to FIG. 6, a plan view of the desk top base is shown wherein a battery compartment 16 is provided for use in connection with a hand power pack unit discussed in FIG. 9 and FIG. 10. A plug-in area for several outlets is indicated at 17. The stem which connects the desk top base to the globe is indicated at 18. A number of control switches, indicated generally at 19, are utilized to properly exhibit the invention as described below. FIG. 7 is a section of the base of FIG. 6 taken in direction of the arrows shown in FIG. 6 and also shows the stem 18 protruding from the desk top base. Small globes S and M, representing the sun and moon, can be illuminated along with the globe to provide special effects. Attachment rings 20 and 21 surround the stem 18 as shown and can be moved in a circular manner to provide rotation around the globe either manually or in response to electronic controls. Arm attachments 22 and 23 connect the rings 20 and 21 to the sun S and moon M, respectively. Such globes or other devices, as appropriate, can be used. A further area is indicated at 24 wherein additional rings can be attached, as desired, to further illustrate additional features. A recessed area 25 in the base accommodates the switches 19 on one side of the stem and a similar recess (not shown) forms the battery area on the other side of the stem as discussed previously. Numeral 26 represents an open area in the base which will house the electrical and mechanical systems used in controlling the operation of the globe apparatus. A plug-in area, indicated by dashed lines at 27, is to be used to enable the desk top unit to operate from a wall switch or a hand power pack unit. Further, other features such as the provision of a sound track, which would coordinate sight and sound, could be plugged in at this location. The outer shell 28 of the base is weighted so as to sufficiently balance the globe and the other attached items discussed above. A pad cushion, or the like, denoted 29, is attached under the base thereby protecting any surface on which the desk top base is placed.

Figure 8:
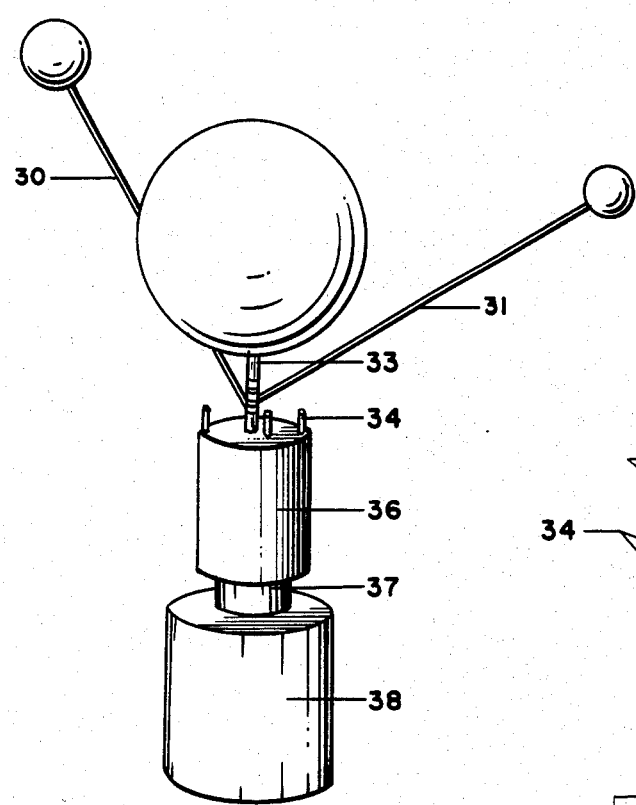
FIG. 8 is a perspective view of a complete self-contained non-desk top unit constructed in accordance with the further embodiment of the invention.

In FIG. 8, a complete self-contained unit, including a globe and its attachments, is shown in perspective form. This unit would be used in areas for full-scale presentations where a desk top model would not be sufficient. This unit can also be rolled from room to room. Arms 30 and 31 generally correspond to arms 22 and 23 of FIG. 7, and it should be pointed out that these arms or arm devices can either be straight or bent at an angle to properly depict the desired position or rotational relationship with respect to the earth. The details of the unit are shown in FIG. 9 wherein a small section of the globe, denoted 32, is provided a recessed area in the surface thereof for assisting in supporting the globe when the stem 33 is raised into place. This is an alternate attachment or mounting for the globe to that shown in FIG. 1. Only a portion of the stem 33 is shown in FIG. 9 and it will be understood that the stem can also support a mounting device such as shown in FIG. 1. Three finger-like support members 34 support the globe when the stem 33 is inserted into a recess 35 in the top part of the self-contained unit. These finger-like members 34 protrude far enough above the surface of the unit so the attachment rings 20 and 21 of FIG. 7 are not damaged in any way. A housing section 36 houses all electrical and mechanical devices which are used to provide operation of the self-contained unit. The battery area and switch assembly can either be housed on the side of top section 36 or on the flat surface on which the finger-like support members 34 are located. A weighted connecting stem 37 extends between the top and bottom parts of the self-contained unit. A portion of stem 37 is hollow in order to provide vertical access between the bottom and top parts of the unit. Doors 38 provide access to a storage area in the bottom half of the self-contained unit. A receptacle or plug area 39, indicated by dashed lines, serves the same function as previously outlined in connection with receptacle 27 of FIG. 7. Several rollers, indicated at 40, are recessed as shown and provide easy movement of the self-contained unit from room to room.

Referring to FIGS. 9 and 10, a plan view and section, respectively, of the hand power pack unit referred to above are presented. Two switching areas, or banks of switches, indicated at 41, are mounted on an electrical housing portion 49 of the unit which houses all of the electrical wiring and the like. These banks of switches 41 control movement of the sun, moon, and other globes, as well as special attachments such as sound, projection, and rotation control devices, lights, power, and other features that can be added to the globe for instructional purposes. A further battery housing portion of the unit, denoted 42, contains the batteries. The surface area, denoted 44, of the battery housing contains instructions as to how to operate the hand power pack unit. A receptacle area 43 receives the plug-in connection from the previously described desk top unit of FIG. 7 or the self contained unit described in connection with FIG. 9. Several small pads, denoted 47, are attached to the bottom of this unit.

Although the invention has been described relative to exemplary embodiments thereof, it will be understood by those skilled in the art that variations and modifications can be effected in the exemplary embodiments without departing from the scope and spirit of the invention.

I claim:

1. A globe apparatus comprising:
   a sphere having major land masses and oceans depicted on the outer surface thereof;
   a first set of detachable elements representing geopolitical entities detachably mounted on said outer surface of said sphere on portions thereof representing land masses, the outer edges of elements being in the shape of the geopolitical entity represented thereby; and
   a second set of detachable elements detachably mounted on the outer surface of said sphere on portions thereof representing land masses, the elements of said second set representing further divisions of the land masses, the upper surfaces of one of said sets of elements being in relief to represent topological features of the portion of the land mass represented thereby, and said one set of detachable elements being mounted on said sphere on top of the other set so as to cover the other set, whereby removal of the one set reveals the other set;
   said sphere comprising four separate quadrants including connecting means for enabling the quadrants to be detachably connected together in different combinations so as to permit division of the globe into the Northern and Southern hemispheres of the Earth, and, alternately, into the Eastern and Western hemispheres of the Earth.

2. A globe apparatus as claimed in claim 1 wherein said first set constitutes said one set, and said second set constitutes said other set and comprises substantially flat elements representing continents.

3. A globe apparatus as claimed in claim 1 wherein said second set of elements represents continents and constitutes said one set.

4. A globe apparatus as claimed in claim 3 wherein the upper surfaces of the first set of elements are also shaped in relief so as to represent topological features of the geopolitical entities represented thereby.

5. A globe apparatus as claimed in claim 4 further comprising a third set of elements detachably mounted on said globe, the elements of said third set being substantially flat but being curved to match the curvature of the globe and said first and second sets of elements being formed in relief and detachably mounted on the third set.

6. A globe apparatus as claimed in claim 1 further comprising a mounting stem for said globe, at least one mounting ring mounted for rotation on said stem; and at least one additional globe supported by the mounting ring for rotation relative to said sphere.

7. A globe apparatus as claimed in claim 6 wherein at least two globes, representing the sun and moon, are provided, said globes being connected by attachment arms to a respective said mounting ring.

* * * * *